(12) United States Patent
Teale et al.

(10) Patent No.: US 10,007,016 B2
(45) Date of Patent: Jun. 26, 2018

(54) DOWNHOLE CLOSED-LOOP MAGNETOSTRICTIVE SENSING ELEMENT FOR DOWNHOLE APPLICATIONS

(71) Applicants: David Teale, Spring, TX (US); Akinjide Akinyode, Houston, TX (US); Joe Freeman, Houston, TX (US)

(72) Inventors: David Teale, Spring, TX (US); Akinjide Akinyode, Houston, TX (US); Joe Freeman, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 359 days.

(21) Appl. No.: 14/970,854

(22) Filed: Dec. 16, 2015

(65) Prior Publication Data

US 2016/0259080 A1 Sep. 8, 2016

Related U.S. Application Data

(60) Provisional application No. 62/127,530, filed on Mar. 3, 2015.

(51) Int. Cl.
| | |
|---|---|
| *G01V 3/08* | (2006.01) |
| *E21B 49/08* | (2006.01) |
| *E21B 47/01* | (2012.01) |
| *E21B 47/06* | (2012.01) |

(52) U.S. Cl.
CPC .............. *G01V 3/08* (2013.01); *E21B 47/011* (2013.01); *E21B 47/06* (2013.01); *E21B 49/08* (2013.01)

(58) Field of Classification Search
CPC ......... G01V 3/08; E21B 47/011; E21B 47/06; E21B 49/08
See application file for complete search history.

(56) References Cited

U.S. PATENT DOCUMENTS

| | | | |
|---|---|---|---|
| 5,150,049 | A | 9/1992 | Schuetz |
| 6,102,673 | A * | 8/2000 | Mott ................. E21B 21/001 137/596.17 |
| 8,627,883 | B2 | 1/2014 | Richards |
| 2002/0194917 | A1 | 12/2002 | Fernald et al. |
| 2004/0042703 | A1 | 3/2004 | Deaton |
| 2007/0107528 | A1 | 5/2007 | Schroeder et al. |

(Continued)

FOREIGN PATENT DOCUMENTS

| | | |
|---|---|---|
| EP | 1367369 B1 | 12/2013 |
| WO | 2015167612 A1 | 11/2015 |

OTHER PUBLICATIONS

"Temposonics®—Position Sensors", Magnetostriction: Basic Physical Elements, MTS Sensors Group, May 2001, 4 pages.

(Continued)

*Primary Examiner* — Wei Wang
(74) *Attorney, Agent, or Firm* — Cantor Colburn LLP (57) ABSTRACT

A downhole closed-loop magnetostrictive sensor includes a magnetic field generating member and a waveguide operatively connected to the magnetic field generating member. At least one of the waveguide and the magnetic field generating member is responsive to a parameter being sensed. A sensor is operatively connected to the waveguide, and a housing includes a chamber enclosing the magnetic field generating member, the waveguide and the sensor. The housing is configured and disposed to withstand a downhole environment.

26 Claims, 5 Drawing Sheets

(56) References Cited

U.S. PATENT DOCUMENTS

2013/0106411 A1    5/2013  Chen et al.
2014/0139226 A1    5/2014  Jaaskelainen et al.
2015/0098487 A1    4/2015  Wang et al.

OTHER PUBLICATIONS

International Search Report and Written Opinion dated May 12, 2016 in related PCT Application No. US2016/015949, 12 pages.
Sheen, Shuh-Haw; "Waveguide-based Ultrasonic and Far-field Electromagnetic Sensors for Downhole Reservoir Characterization"; U.S. Department of Energy, 2010, 14 Pages.
Wang, K.; "Ultrasonic and Electromagnetic Sensors for Downhole Reservoir Characterization"; Proceedings, Thirty-Sixth Workshop on Geothermal Reservoir Engineering Stanford University, 2011, 7 Pages.

* cited by examiner

FIG. 1

DOWNHOLE CLOSED-LOOP MAGNETOSTRICTIVE SENSING ELEMENT FOR DOWNHOLE APPLICATIONS

BACKGROUND

Resource recovery and exploration systems typically include a downhole string formed from a number of tubulars. Often times, one or more of the tubulars, and/or tools that are passed through the downhole string, may include sensors. The sensors may be configured to detect one or more of various downhole parameters including formation related parameters, resource related parameters, and downhole string and/or tool related parameters. For example, sensors may be deployed downhole to detect temperatures, pressures, relative position, and/or vibration.

SUMMARY

A downhole closed-loop magnetostrictive sensor includes a magnetic field generating member and a waveguide operatively connected to the magnetic field generating member. At least one of the waveguide and the magnetic field generating member is responsive to a parameter being sensed. A sensor is operatively connected to the waveguide, and a housing includes a chamber enclosing the magnetic field generating member, the waveguide, and the sensor. The housing is configured and disposed to withstand a downhole environment.

A resource exploration system includes an uphole system including at least one pump, and a downhole system including a downhole string having a plurality of tubulars extending into a formation. At least one of the plurality of tubulars includes a closed-loop magnetostrictive sensor including a magnetic field generating member, and a waveguide operatively connected to the magnetic field generating member. At least one of the waveguide and the magnetic field generating member is responsive to a parameter being sensed. A sensor is operatively connected to the waveguide, and a housing includes a chamber enclosing the magnetic field generating member, the waveguide, and the sensor. The housing is configured and disposed to withstand a downhole environment.

BRIEF DESCRIPTION OF THE DRAWINGS

Referring now to the drawings wherein like elements are numbered alike in the several Figures.

DETAILED DESCRIPTION

Figure 1:
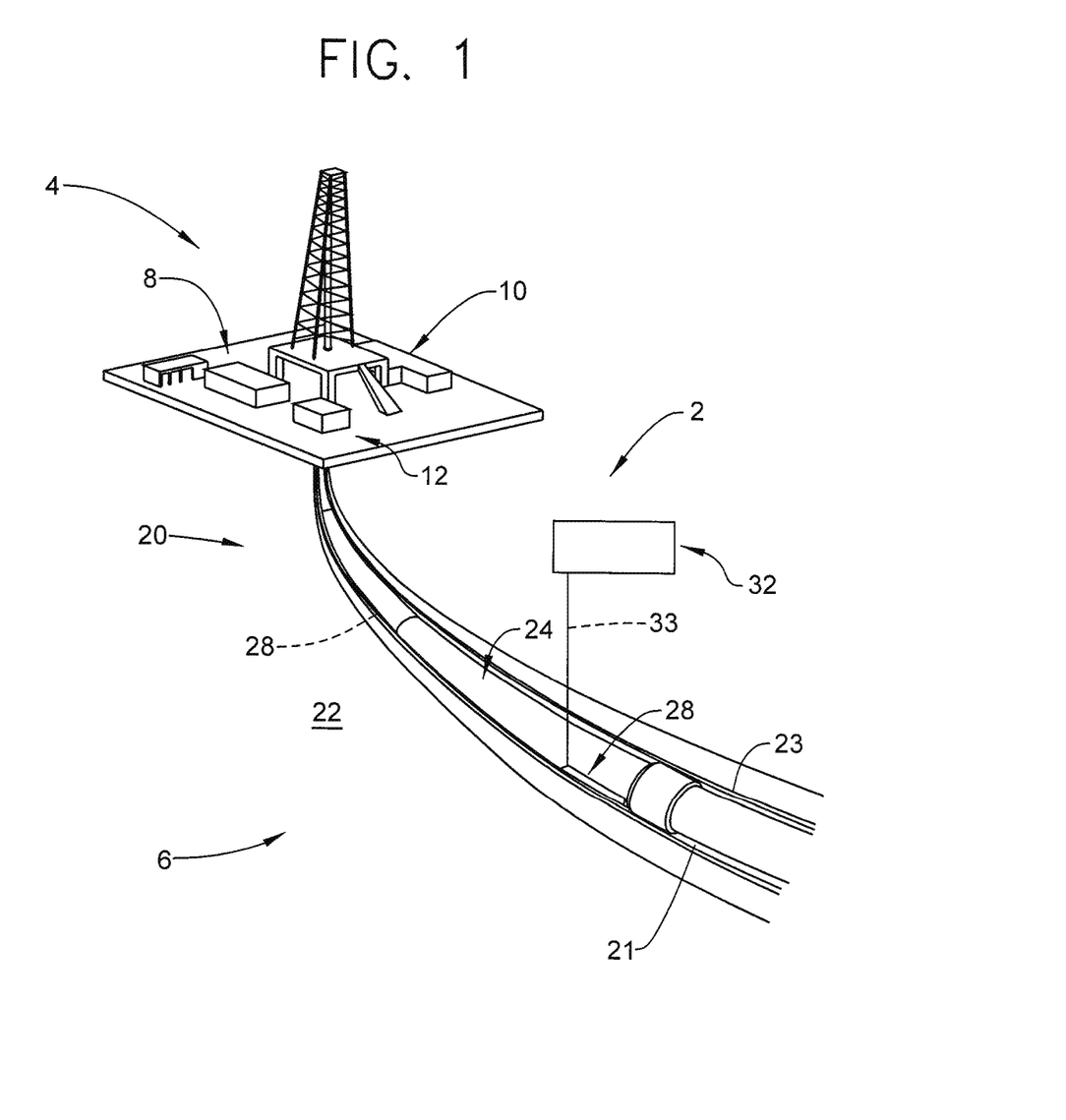
FIG. 1 depicts a resource recovery and exploration system including a downhole tubular having a magnetostrictive sensor, in accordance with an exemplary embodiment.

A resource exploration system, in accordance with an exemplary embodiment, is indicated generally at 2, in FIG. 1. Resource exploration system 2 should be understood to include well drilling operations, resource extraction and recovery, $CO_2$ sequestration, and the like. Resource exploration system 2 may include an uphole system 4 operatively connected to a downhole system 6. Uphole system 4 may include pumps 8 that aid in completion and/or extraction processes as well as fluid storage 10 and a control room 12 that houses various systems for monitoring downhole parameters. Fluid storage 10 may contain a completion fluid (not shown) that is introduced into downhole system 6.

Downhole system 6 may include a downhole string 20 that is extended into a wellbore 21 formed in formation 22. Wellbore 21 may include a wellbore casing 23. Downhole string 20 may include a number of connected downhole tools or tubulars 24. One of tubulars 24 may include a magnetostrictive sensor 28. Magnetostrictive sensor 28 is operatively connected to a controller 32 via wireline 33. Controller 32 may reside in control room 12.

Figure 2:
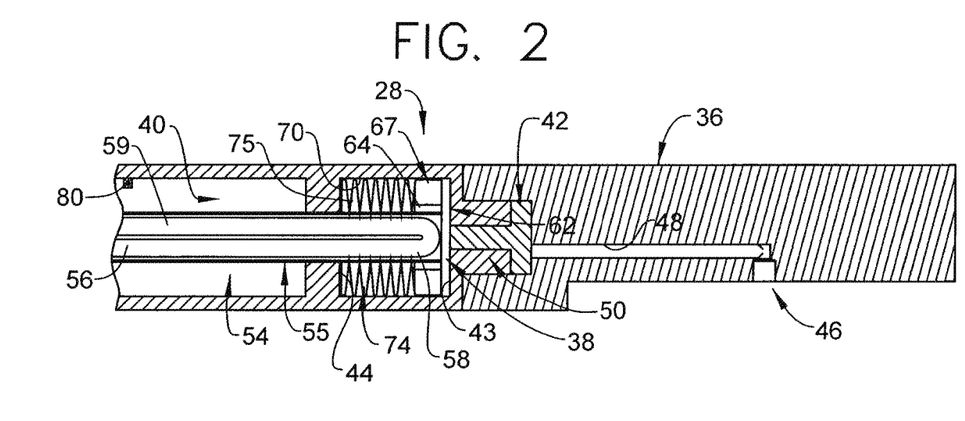
FIG. 2 depicts the magnetostrictive sensor of FIG. 1 in a first sensing position.
Figure 3:
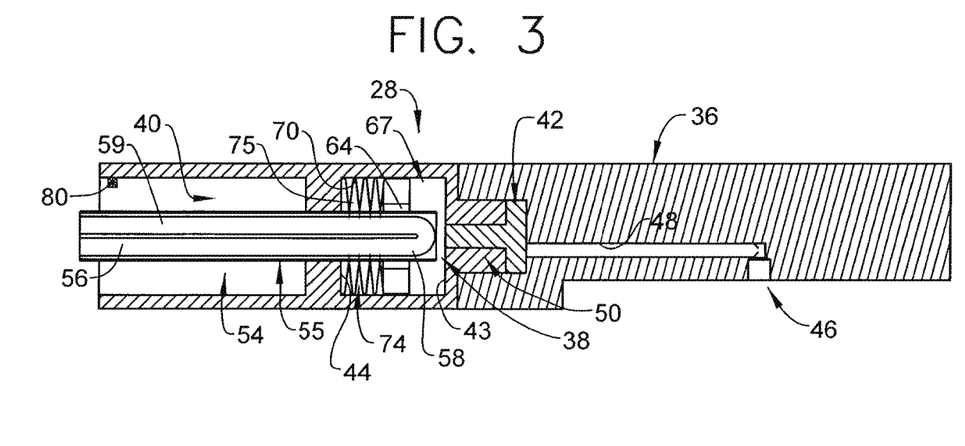
FIG. 3 depicts the magnetostrictive sensor of FIG. 2 in a second sensing position.

As shown in FIGS. 2 and 3, magnetostrictive sensor 28 includes a housing 36 including a sensing chamber 38, a connection chamber 40, and an inlet chamber 42. Inlet chamber 42 serves to accept downhole fluids passing into sensing chamber 38. Connection chamber 40 may include various electronics and/or connections that provide an interface to controller 32. Sensing chamber 38 includes a first or inlet end 43 and a second end 44. Housing 36 includes an inlet 46 that is fluidically connected to inlet chamber 42 through an inlet passage 48. Inlet chamber 42 is fluidically connected to sensing chamber 38 through a sensing chamber inlet 50. Housing 36 is arranged in tubular 24 and is configured to withstand downhole pressure and temperatures. To that end, inlet 46 is exposed to downhole fluids in formation 22.

In accordance with an aspect of an exemplary embodiment, housing 36 may be formed from a metal having a high yield strength and include a cylindrical geometry. In accordance with one exemplary aspect, housing 36 may be formed from Aluminum having a yield strength of about 54 ksi (372.32 MPa) and a thickness capable of withstanding external pressures of at least 5000 psi (34 MPa) with an internal pressure of about 14.7 psi (101.4 kPa). Housing 36 may be formed through a variety of manufacturing processes including drilling, gun-drilling, machining using a lathe and/or mill, rolling and welding, or extrusion. In further accordance with an exemplary aspect, magnetostrictive sensor 38 may be encased with a non-magnetic material, examples of which could include varieties of nickel alloys, aluminum alloys, or other non-ferrous metals. In this manner, a magnetic field may permeate through the housing 36 with minimal disturbance. Generally, dimensions of housing 36 are chosen to enclose a desired magnetostrictive sensor 28, and materials employed to form housing 36 are selected to include desired material properties for a particular installation.

Magnetostrictive sensor 28 includes a waveguide 54 arranged in a waveguide housing 55. Waveguide 54 includes a first end 56 arranged in sensing chamber 38, a second end 58 arranged in connection chamber 40, and an intermediate portion 59 extending therebetween. A magnetic field generating member 62 is movably mounted relative to waveguide 54. Magnetic field generating member 62 is shown in the form of a magnet 64 having a central opening (not separately labeled) receptive of waveguide housing 55. Magnet 64 is mounted to a piston 67 that abuts an inner surface 70 of sensing chamber 38. A bellows 74 including a plurality of folds 75 extends between second end 44 of sensing chamber 38 and piston 67.

In accordance with an aspect of an exemplary embodiment, downhole fluids pass into inlet 46 and flow through inlet passage 48 and sensing chamber inlet 50 to sensing chamber 38. The downhole fluids act upon piston 67 shifting magnet 64 relative to waveguide 54, as shown in FIG. 3. The movement of magnet 64 causes a change in one or more physical properties of waveguide 54 that is perceived by a sensor 80 in connection chamber 40. For example, magnet 64 may change a linearity of waveguide 54, a length of waveguide 54, or the like. Sensor 80 signals the perceived change to controller 32 which may then determine a pressure of the downhole fluid. Bellows 74 provides a biasing force to piston 67 urging magnet 64 towards first end 43. Sensor 80 may also detect vibrations at magnetostrictive sensor 28 by sensing any chatter or movements of magnet 64 on waveguide 54.

Figure 4:
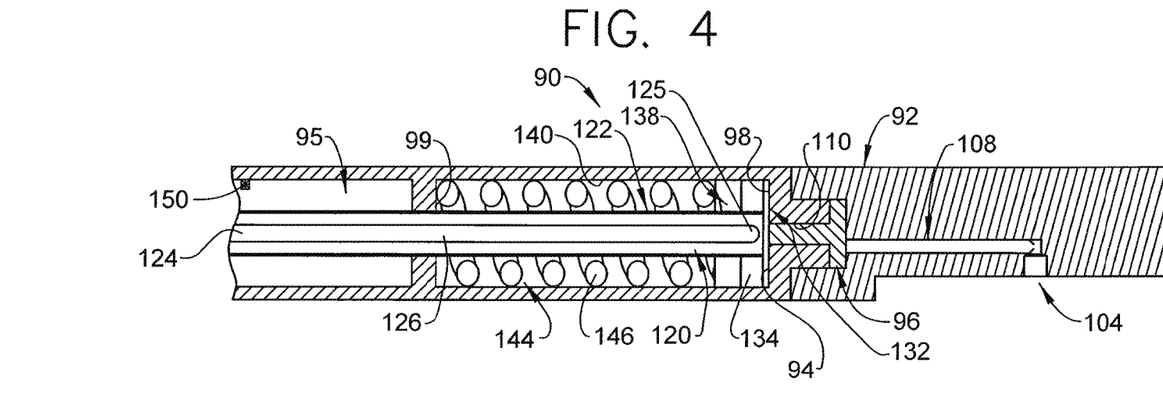
FIG. 4 depicts the magnetostrictive sensor, in accordance with another aspect of an exemplary embodiment, in a first sensing position.
Figure 5:
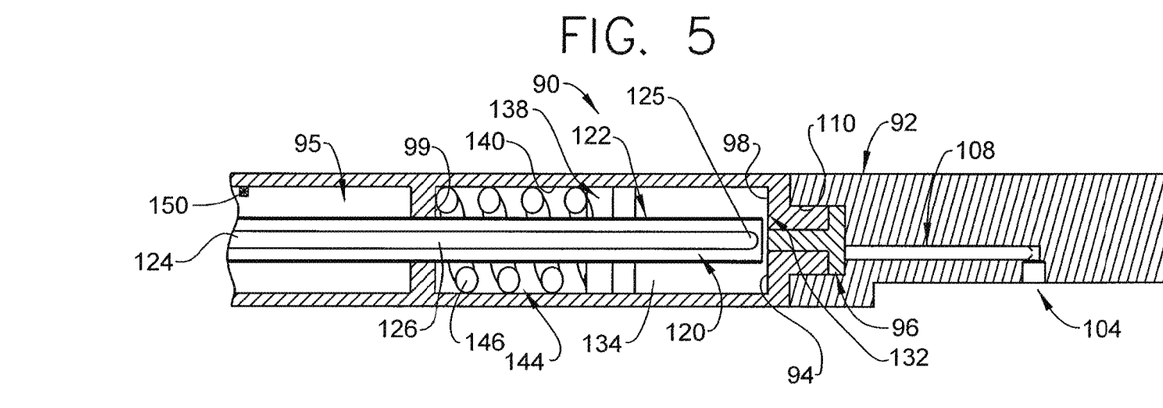
FIG. 5 depicts the magnetostrictive sensor of FIG. 4 in a second sensing position.

Reference will now follow to FIGS. 4 and 5 in describing a magnetostrictive sensor 90 in accordance with another aspect of an exemplary embodiment. Magnetostrictive sensor 90 includes a housing 92 including a sensing chamber 94, a connection chamber 95 and an inlet chamber 96. Inlet chamber 96 serves to accept downhole fluids passing into sensing chamber 94. Connection chamber 95 may include various electronics and/or connections that provide an interface to controller 32. Sensing chamber 94 includes a first end 98 and a second or inlet end 99. Housing 92 includes an inlet 104 that is fluidically connected to inlet chamber 96 through an inlet passage 108. Inlet chamber 96 is fluidically connected to sensing chamber 94 through a sensing chamber inlet 110. Housing 92 is arranged in tubular 24 and is configured to withstand downhole pressure and temperatures. To that end, inlet 104 is exposed to downhole fluids in formation 22.

Magnetostrictive sensor 90 includes a waveguide 120 arranged in a waveguide housing 122. Waveguide 120 includes a first end 124 arranged in connection chamber 95, a second end 125 arranged in sensing chamber 94, and an intermediate portion 126 extending therebetween. A magnetic field generating member 132 is movably mounted relative to waveguide 120. Magnetic field generating member 132 is shown in the form of a magnet 134 having a central opening (not separately labeled) receptive of waveguide 120. Magnet 134 is mounted to a piston 138 that abuts an inner surface 140 of sensing chamber 94. A spring 144 including a plurality of coils 146 extends between second end 99 of sensing chamber 94 and piston 138.

In accordance with an aspect of an exemplary embodiment, downhole fluids pass into inlet 104 and flow through inlet passage 108 and sensing chamber inlet 110 to sensing chamber 94. The downhole fluids act upon piston 138 shifting magnet 134 relative to waveguide 120, as shown in FIG. 5. The movement of magnet 134 causes a change in one or more physical properties of waveguide 120 that is perceived by a sensor 150 in connection chamber 95. Sensor 150 signals the perceived change to controller 32 which may then determine a pressure of the downhole fluid. Spring 144 provides a biasing force to piston 138 urging magnet 134 towards first end 98. Sensor 150 may also detect vibrations at magnetostrictive sensor 90 by sensing any chatter or movements of magnet 134 on waveguide 120.

Figure 6:
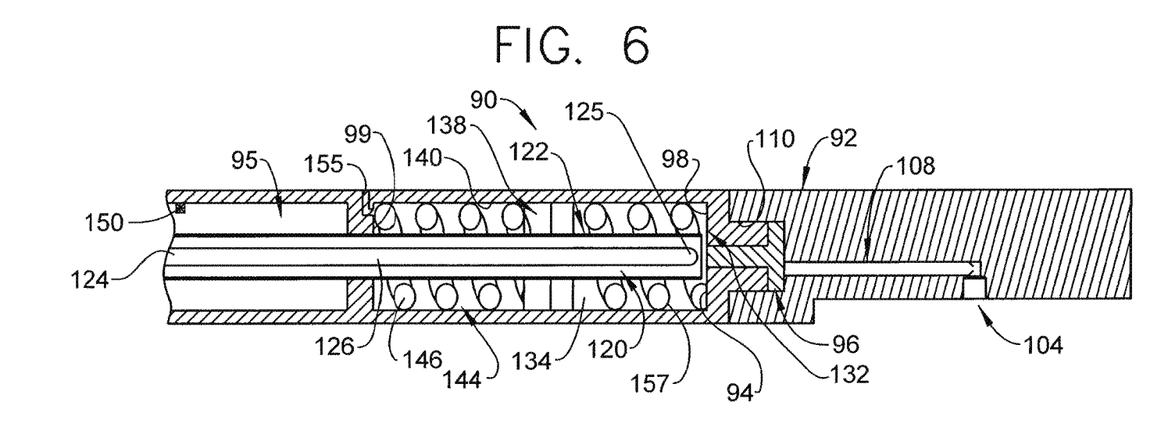
FIG. 6 depicts the magnetostrictive sensor in accordance with still yet another aspect of an exemplary embodiment.

FIG. 6, wherein like reference numbers represent corresponding parts in the respective views, depicts magnetostrictive sensor 90 having a port 155 extending through housing 92. Port 155 fluidically connects with sensing chamber 94. More specifically, port 155 may be fluidically connected with a secondary pressure source (not shown) that delivers a fluid into sensing chamber 94. The secondary pressure source may be arranged uphole or along downhole string 20. The fluid entering sensing chamber 94 may act upon piston 138. In response, piston 138 may act against a secondary spring 157 arranged in sensing chamber 94. Secondary spring 157 is arranged between piston 138 and first end 98 of sensing chamber 94. In this manner, magnetostrictive sensor 90 may act as a differential pressure sensor that enables controller 32 to sense a pressure drop across piston 138 between port 155 and inlet 104 to determine a flow measurement.

Figure 7:
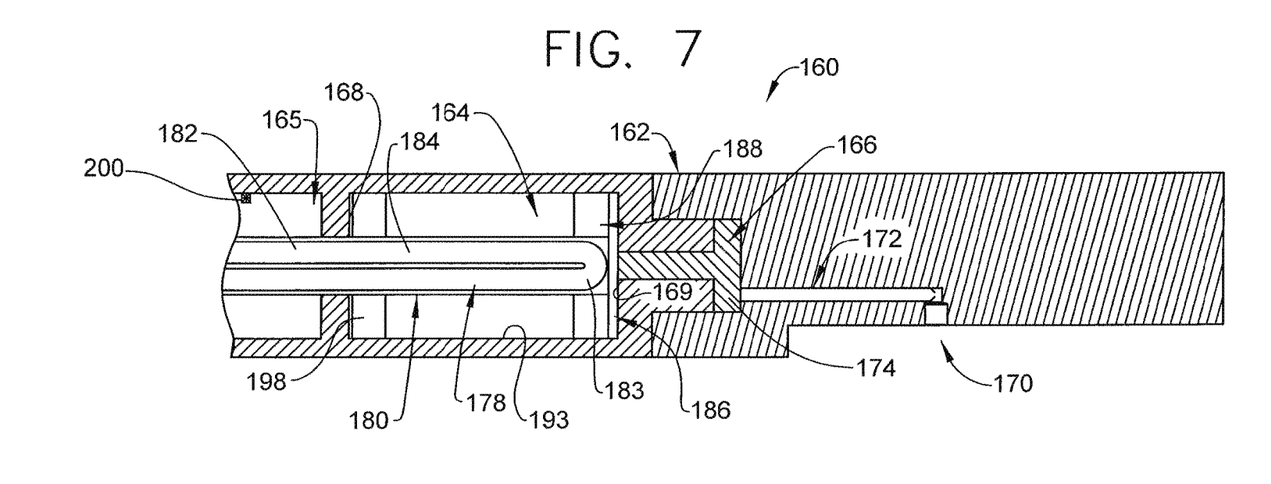
FIG. 7 depicts the magnetostrictive sensor, in accordance with yet another aspect of an exemplary embodiment, in a first sensing position.
Figure 8:
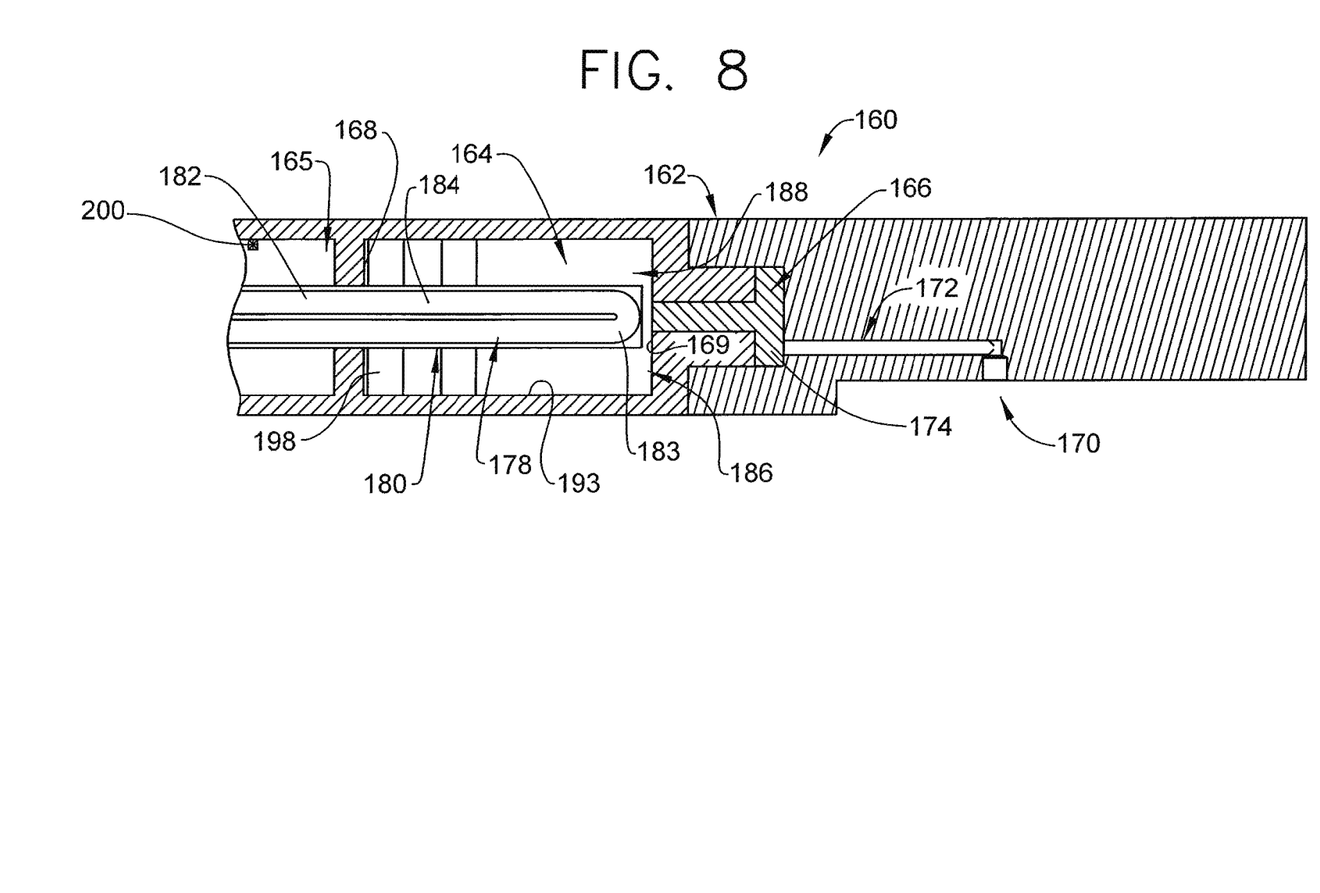
FIG. 8 depicts the magnetostrictive sensor of FIG. 6 in a second sensing position.

Reference will now follow to FIGS. 7 and 8 in describing a magnetostrictive sensor 160 in accordance with another aspect of an exemplary embodiment. Magnetostrictive sensor 160 includes a housing 162 having a sensing chamber 164, a connection chamber 165 and an inlet chamber 166. Inlet chamber 166 serves to accept downhole fluids passing into sensing chamber 164. Connection chamber 165 may include various electronics and/or connections that provide an interface to controller 32. Sensing chamber 164 includes a first end 168 and a second or inlet end 169. Housing 162 includes an inlet 170 that is fluidically connected to inlet chamber 166 through an inlet passage 172. Inlet chamber 166 is fluidically connected to sensing chamber 164 through a sensing chamber inlet 174. Housing 162 is arranged in tubular 24 and is configured to withstand downhole pressure and temperatures. To that end, inlet 170 is exposed to downhole fluids in formation 22.

Magnetostrictive sensor 160 includes a waveguide 178 arranged in a waveguide housing 180. Waveguide 178 includes a first end 182 arranged in connection chamber 165, a second end 183 arranged in sensing chamber 164, and an intermediate portion 184 extending therebetween. A magnetic field generating member 186 is movably mounted relative to waveguide 178. Magnetic field generating member 186 is shown in the form of a magnet/piston 188 having a central opening (not separately labeled) receptive of waveguide 178. Magnet/piston 188, as the name implies, also serves as a piston engaging an inner surface 193 in sensing chamber 164. Another magnet 198 is arranged at second end 169 of sensing chamber 164.

In accordance with an aspect of an exemplary embodiment, downhole fluids pass into inlet 170 and flow through inlet passage 172 and sensing chamber inlet 174 to sensing chamber 164. The downhole fluids act upon magnet/piston 188 which then shifts relative to waveguide 178, as shown in FIG. 8. The movement of magnet/piston 188 causes a change in one or more physical properties of waveguide 178 that is perceived by a sensor 200 in connection chamber 165. Sensor 200 signals the perceived change to controller 32 which may then determine a pressure of the downhole fluid. Magnet 198 provides a biasing force that urges magnet/piston 188 towards first end 168. Sensor 200 may also detect vibrations at magnetostrictive sensor 160 by sensing any chatter or movements of magnet/piston 188 on waveguide 178.

At this point it should be understood that exemplary embodiments describe a magnetostrictive sensor configured for downhole applications. Specifically, the magnetostrictive sensor is arranged in a housing that is designed to be exposed to downhole pressures, temperatures, vibrations and other downhole conditions, and protect internal sensing components. In this manner, exemplary embodiments may be employed to detect and/or measure various downhole parameters including pressure, temperature, vibration and the like and/or combinations thereof. Additionally, exemplary embodiments may be employed for position sensing. In addition, while described as shifting a magnetic field generating member relative to a waveguide to sense pressure and/or vibration, it should be understood that exemplary embodiments could include shifting the waveguide relative to the magnetic field generating member.

Set forth below are some embodiments of the foregoing disclosure:

Embodiment 1

A downhole closed-loop magnetostrictive sensor comprising: a magnetic field generating member, a waveguide operatively connected to the magnetic field generating member, at least one of the waveguide, and the magnetic field generating member being responsive to a parameter being sensed, a sensor operatively connected to the waveguide, and a housing including a chamber enclosing the magnetic field generating member, the waveguide and the sensor, the housing being configured and disposed to withstand a downhole environment.

Embodiment 2

The downhole closed-loop magnetostrictive sensor of embodiment 1, wherein the magnetic field generating member comprises a magnet including a central opening receptive of the waveguide.

Embodiment 3

The downhole closed-loop magnetostrictive sensor of embodiment 2, wherein the chamber includes a first end, a second end, and an intermediate portion extending therebetween, the waveguide extending from about the first end to at least about the second end.

Embodiment 4

The downhole closed-loop magnetostrictive sensor according to embodiment 3, wherein the magnet comprises a piston slidingly received within the chamber.

Embodiment 5

The downhole closed-loop magnetostrictive sensor according to embodiment 3, further comprising: a piston operatively connected to the magnet, the piston being responsive to a pressure in the chamber to shift the magnet relative to the waveguide between the first and second ends.

Embodiment 6

The downhole closed-loop magnetostrictive sensor according to embodiment 5, further comprising a bellows operatively connected to the piston, the bellows being configured and disposed to shift the piston from one of the first and second ends towards the other of the first and second ends.

Embodiment 7

The downhole closed-loop magnetostrictive sensor according to embodiment 6, wherein the bellows extends from the second end of the chamber to the piston.

Embodiment 8

The downhole closed-loop magnetostrictive sensor according to embodiment 5, further comprising: a spring arranged in the chamber and operably connected to the piston, the spring being configured and disposed to shift the piston from one of the first and second ends towards the other of the first and second ends.

Embodiment 9

The downhole closed-loop magnetostrictive sensor according to embodiment 8, wherein the spring extends from the second end of the chamber to the piston.

Embodiment 10

The downhole closed-loop magnetostrictive sensor according to embodiment 5, further comprising: another magnet arranged at one of the first and second ends of the chamber, the another magnet being configured and disposed to bias the magnet toward the other of the first and second ends of the chamber.

Embodiment 11

The downhole closed-loop magnetostrictive sensor according to embodiment 10, wherein the another magnet is mounted at the second end of the chamber.

Embodiment 12

The downhole closed-loop magnetostrictive sensor according to embodiment 5, further comprising: a port formed in the housing and fluidically connected to the chamber, the port introducing a fluid from a secondary pressure source into the chamber to act on the piston.

Embodiment 13

The downhole closed-loop magnetostrictive sensor according to embodiment 12, further comprising: a first spring arranged in the chamber and operably connected to a first side of the piston, a second spring arranged in the chamber and operably connected to a second, opposing side of the piston, and a controller operatively connected to the sensor, the controller being configured and disposed to determine a pressure drop across the piston.

Embodiment 14

The downhole closed-loop magnetostrictive sensor according to embodiment 1, further comprising a controller operatively connected to the sensor, the controller being configured and disposed to determine at least one of a pressure of a fluid in the chamber and a downhole vibration parameter based on changes to the waveguide influenced by the magnetic field generating member.

Embodiment 15

A resource exploration system comprising: an uphole system including at least one pump, and a downhole system including a downhole string having a plurality of tubulars extending into a formation, at least one of the plurality of tubulars including a closed-loop magnetostrictive sensor comprising: a magnetic field generating member, a waveguide operatively connected to the magnetic field generating member, at least one of the waveguide and the magnetic field generating member being responsive to a parameter being sensed, a sensor operatively connected to the waveguide, and a housing including a chamber enclosing the magnetic field generating member, the waveguide, and the sensor, the housing being configured and disposed to withstand a downhole environment.

Embodiment 16

The resource exploration system according to embodiment 15, wherein the magnetic field generating member comprises a magnet including a central opening receptive of the waveguide.

Embodiment 17

The resource exploration system according to embodiment 16, wherein the chamber includes a first end, a second end, and an intermediate portion extending therebetween, the waveguide extending from about the first end to at least about the second end.

Embodiment 18

The resource exploration system according to embodiment 17, further comprising: a piston operatively connected to the magnet, the piston being responsive to a pressure in the chamber to shift the magnet relative to the waveguide between the first and second ends.

Embodiment 19

The resource exploration system according to embodiment 18, further comprising a bellows operatively connected to the piston, the bellows being configured and disposed to shift the piston from one of the first and second ends towards the other of the first and second ends.

Embodiment 20

The resource exploration system according to embodiment 17, wherein the magnet comprises a piston slidingly received within the chamber.

Embodiment 21

The resource exploration system according to embodiment 19, wherein the bellows extends from the second end of the chamber to the piston.

Embodiment 22

The resource exploration system according to embodiment 18, further comprising: a spring arranged in the chamber and operably connected to the piston, the spring being configured and disposed to shift the piston from one of the first and second ends towards the other of the first and second ends.

Embodiment 23

The resource exploration system according to embodiment 22, wherein the spring extends from the second end of the chamber to the piston.

Embodiment 24

The resource exploration system according to embodiment 18, further comprising: another magnet arranged at one of the first and second ends of the chamber, the another magnet being configured and disposed to bias the magnet toward the other of the first and second ends of the chamber.

Embodiment 25

The resource exploration system according to embodiment 24, wherein the another magnet is mounted at the second end of the chamber.

Embodiment 26

The resource exploration system according to embodiment 15, further comprising a controller operatively connected to the sensor, the controller being configured and disposed to determine at least one of a pressure of a fluid in the chamber and a downhole vibration parameter based on changes to the waveguide influenced by the magnetic field generating member.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A downhole closed-loop magnetostrictive sensor comprising:
   a magnetic field generating member;
   a waveguide operatively connected to the magnetic field generating member, at least one of the waveguide, and the magnetic field generating member being responsive to a parameter being sensed;
   a sensor operatively connected to the waveguide; and
   a housing including a chamber enclosing the magnetic field generating member, the waveguide and the sensor, the housing being configured and disposed to withstand a downhole environment.

2. The downhole closed-loop magnetostrictive sensor according to claim 1, wherein the magnetic field generating member comprises a magnet including a central opening receptive of the waveguide.

3. The downhole closed-loop magnetostrictive sensor according to claim 2, wherein the chamber includes a first end, a second end, and an intermediate portion extending therebetween, the waveguide extending from about the first end to at least about the second end.

4. The downhole closed-loop magnetostrictive sensor according to claim 3, wherein the magnet comprises a piston slidingly received within the chamber.

5. The downhole closed-loop magnetostrictive sensor according to claim 3, further comprising: a piston operatively connected to the magnet, the piston being responsive to a pressure in the chamber to shift the magnet relative to the waveguide between the first and second ends.

6. The downhole closed-loop magnetostrictive sensor according to claim 5, further comprising a bellows operatively connected to the piston, the bellows being configured and disposed to shift the piston from one of the first and second ends towards the other of the first and second ends.

7. The downhole closed-loop magnetostrictive sensor according to claim 6, wherein the bellows extends from the second end of the chamber to the piston.

8. The downhole closed-loop magnetostrictive sensor according to claim 5, further comprising: a spring arranged in the chamber and operably connected to the piston, the spring being configured and disposed to shift the piston from one of the first and second ends towards the other of the first and second ends.

9. The downhole closed-loop magnetostrictive sensor according to claim 8, wherein the spring extends from the second end of the chamber to the piston.

10. The downhole closed-loop magnetostrictive sensor according to claim 5, further comprising: another magnet arranged at one of the first and second ends of the chamber, the another magnet being configured and disposed to bias the magnet toward the other of the first and second ends of the chamber.

11. The downhole closed-loop magnetostrictive sensor according to claim 10, wherein the another magnet is mounted at the second end of the chamber.

12. The downhole closed-loop magnetostrictive sensor according to claim 5, further comprising: a port formed in the housing and fluidically connected to the chamber, the port introducing a fluid from a secondary pressure source into the chamber to act on the piston.

13. The downhole closed-loop magnetostrictive sensor according to claim 12, further comprising:
    a first spring arranged in the chamber and operably connected to a first side of the piston;
    a second spring arranged in the chamber and operably connected to a second, opposing side of the piston; and
    a controller operatively connected to the sensor, the controller being configured and disposed to determine a pressure drop across the piston.

14. The downhole closed-loop magnetostrictive sensor according to claim 1, further comprising a controller operatively connected to the sensor, the controller being configured and disposed to determine at least one of a pressure of a fluid in the chamber and a downhole vibration parameter based on changes to the waveguide influenced by the magnetic field generating member.

15. A resource exploration system comprising:
    an uphole system including at least one pump; and
    a downhole system including a downhole string having a plurality of tubulars extending into a formation, at least one of the plurality of tubulars including a closed-loop magnetostrictive sensor comprising:
      a magnetic field generating member;
      a waveguide operatively connected to the magnetic field generating member, at least one of the waveguide and the magnetic field generating member being responsive to a parameter being sensed;
      a sensor operatively connected to the waveguide; and
      a housing including a chamber enclosing the magnetic field generating member, the waveguide, and the sensor, the housing being configured and disposed to withstand a downhole environment.

16. The resource exploration system according to claim 15, wherein the magnetic field generating member comprises a magnet including a central opening receptive of the waveguide.

17. The resource exploration system according to claim 16, wherein the chamber includes a first end, a second end, and an intermediate portion extending therebetween, the waveguide extending from about the first end to at least about the second end.

18. The resource exploration system according to claim 17, further comprising: a piston operatively connected to the magnet, the piston being responsive to a pressure in the chamber to shift the magnet relative to the waveguide between the first and second ends.

19. The resource exploration system according to claim 18, further comprising a bellows operatively connected to the piston, the bellows being configured and disposed to shift the piston from one of the first and second ends towards the other of the first and second ends.

20. The resource exploration system according to claim 19, wherein the bellows extends from the second end of the chamber to the piston.

21. The resource exploration system according to claim 18, further comprising: a spring arranged in the chamber and operably connected to the piston, the spring being configured and disposed to shift the piston from one of the first and second ends towards the other of the first and second ends.

22. The resource exploration system according to claim 21, wherein the spring extends from the second end of the chamber to the piston.

23. The resource exploration system according to claim 17, wherein the magnet comprises a piston slidingly received within the chamber.

24. The resource exploration system according to claim 18, further comprising: another magnet arranged at one of the first and second ends of the chamber, the another magnet being configured and disposed to bias the magnet toward the other of the first and second ends of the chamber.

25. The resource exploration system according to claim 24, wherein the another magnet is mounted at the second end of the chamber.

26. The resource exploration system according to claim 15, further comprising a controller operatively connected to the sensor, the controller being configured and disposed to determine at least one of a pressure of a fluid in the chamber and a downhole vibration parameter based on changes to the waveguide influenced by the magnetic field generating member.

* * * * *